United States Patent [19]
Chapman

[11] Patent Number: 5,073,943
[45] Date of Patent: Dec. 17, 1991

[54] AUTOMOTIVE AUDIO SYSTEM HAVING ACTIVE CONTROLS IN REDUCED POWER STATE

[75] Inventor: Max C. Chapman, Plymouth, Mich.

[73] Assignee: Ford Motor Company, Dearborn, Mich.

[21] Appl. No.: 290,726

[22] Filed: Dec. 27, 1988

[51] Int. Cl.$^5$ ............................................... H04B 1/00
[52] U.S. Cl. .................................................... 381/86
[58] Field of Search ....................... 340/902, 904, 426; 368/10; 381/86, 109

[56] References Cited

U.S. PATENT DOCUMENTS

| | | |
|---|---|---|
| 3,864,578 | 2/1975 | Lackey . |
| 3,890,592 | 6/1975 | Kitamura et al. . |
| 4,455,623 | 6/1984 | Wesemeyer et al. . |
| 4,698,748 | 10/1987 | Juzswik et al. . |
| 4,792,783 | 12/1988 | Burgess et al. ........................ 340/461 |

OTHER PUBLICATIONS

"COP888CG-Device Spec", National Semiconductor Corp., Rev. C, Jan. 19, 1988.

Primary Examiner—Forester W. Isen
Attorney, Agent, or Firm—Mark Mollon; Roger L. May

[57] ABSTRACT

An automotive audio system is provided such that system controls, either pushbutton keypad or rotary switches, connect to an external interrupt pin of a microcontroller capable of restarting the microcontroller from its halt or power-down state. A control activity results in the microcontroller waking up from its halt state, monitoring the system control, and recording system parameter changes in a keep-alive memory. For example, the volume of the system can be changed while the system main power and functions are off. In another embodiment, the microcontroller can be woken up in order to display time-of-day information while both the audio system and the automobile are turned off. After displaying the information or changing the system parameter, the microcontroller returns to its halt state in order to conserve battery power. When the audio system is fully turned on, the most recent parameter setting that was recorded is used to initialize the system. Thus, a user can ensure that audio volume is not too loud prior to powering on the audio system.

16 Claims, 3 Drawing Sheets

AUTOMOTIVE AUDIO SYSTEM HAVING ACTIVE CONTROLS IN REDUCED POWER STATE

BACKGROUND OF THE INVENTION

The present invention relates in general to automotive sound systems and, more specifically, to a microprocessor-controlled system having access to system parameters while the microprocessor is primarily in a powered down state.

Today's advanced audio systems typically include a microcontroller which supervises the operation of the system. The use of a microcontroller gives the system designer a greater amount of flexibility in implementing new system functions. For example, microcontrollers facilitate various features such as electronic tuning, digital displays, search functions, and digital inputs. It is common practice to store the system operating parameters used by the microcontroller in a keep-alive memory when the car ignition switch is powered off and to restore these parameters when the ignition is again powered on.

Popular input devices for microprocessor controlled audio systems include a keypad matrix and a continuously rotatable electronic control knob. With these input controls, there is no longer a one-to-one correspondence between the setting of an audio parameter, such as volume, and the location of an input device as is the case with analog devices (e.g., potentiometers). Thus, an operator or driver is typically unable to examine a control setting on the audio system to determine a level prior to turning on the car ignition switch.

While it is desirable to retain operating parameters such as tuned station and volume while the ignition is off, problems can arise when the last settings which are used are disagreeable to a new operator such as where a different driver enters the automobile. The radio may have been turned off while at a high volume which might startle a user when the audio system is again turned on.

Microprocessor-controlled audio systems also feature the use of the microprocessor (or an associated device) to keep track of and display time-of-day on the system display panel. Typically, audio systems equipped with a time-of-day clock display the time even when the audio system power switch is turned off. However, such systems require that the car ignition switch be turned on (or to its accessory position) in order to provide a time-of-day display, which can be inconvenient.

Prior art microprocessor-controlled audio systems have failed to solve the foregoing problems due to the fact that audio system functions, such as control input and the display, are inactive while the car ignition is off. In particular, the microcontroller typically enters a halt state when the ignition switch is off in order to conserve battery power. A typical microcontroller consumes 15 milliamps or more of current during operation. This is too high a current to allow audio system normal operation when the battery is not being recharged by engine operation. By entering a halt state in which no further instructions are executed and in which the microcontroller clock oscillator is halted, current consumption by the microcontroller is typically reduced to less than one microamp. In prior art systems, the microcontroller is reset and enters its operating state when the ignition is again turned on. Although battery drain is minimized according to the prior art system, there is no operator access to system functions when the system is off and the foregoing problems are experienced.

SUMMARY OF THE INVENTION

Accordingly, it is a principal object of the present invention to provide an audio system and a method of operation which are not subject to the foregoing disadvantages.

It is another object of the invention to provide "live" digital controls to a microprocessor-controlled audio system while the system is turned off.

It is another object of the invention to provide extension of electronic volume controls to more closely emulate the behavior of analog volume control potentiometers.

It is yet another object of the invention to provide method and apparatus for providing access to audio system parameters without causing a complete power-up of the system.

These and other objects are achieved in a method for accessing a stored parameter or initiating a system activity in a temporarily powered-down microprocessor-controlled audio system without instituting full operation of the system, which method comprises the steps of: (a) instituting an interruptable powered-down state of the microprocessor with the parameters stored in a keep-alive memory; (b) generating an interrupt signal in response to a non-main power-up control activity on at least one input device of the audio system while the microprocessor is in the powered-down state and providing the interrupt signal to the microprocessor; (c) powering-up the microprocessor upon receipt of the interrupt signal; (d) determining the source of the interrupt signal; and (e) executing a service routine corresponding to the source of the interrupt signal. Preferably, the microprocessor is then returned to the powered-down state when the control activity ceases for a predetermined period of time.

Depending upon the source of the interrupt signal, the stored parameter (e.g, system volume) can be modified, the stored parameter may be displayed (e.g., time of day), and/or an activity such as tape ejection can be performed.

In another aspect of the invention, an automotive audio system is provided comprising an audio processing circuit, a display, microprocessor means, ignition sense means, and input means. The microprocessor means is coupled to the audio processing circuit and to the display for controlling the audio system while in an operating state. The microprocessor means has a powered-down state for reducing power consumption initiated by a power-down command. The operating state of the microprocessor means is reactivated from the powered-down state by a wake-up signal. The microprocessor means controls at least one parameter of the audio system in accordance with a digital value. The microprocessor means includes a random access memory having a memory location storing the digital value such that the digital value is retained in the memory during the powered-down state. The ignition sense means is coupled to the microprocessor means and has an OFF state for generating a power-down command and has an ON state for generating a first wake-up signal. The input means is coupled to the microprocessor means for generating a second wake-up signal when actuated while the microprocessor means is in the powered-down state and for initiating a temporary operating state of the microprocessor means for executing a service routine corresponding to the second wake-up signal.

BRIEF DESCRIPTION OF THE DRAWINGS

The novel features of the invention are set forth with particularity in the appended claims. The invention itself, however, both as to its structure and its method of operation, together with further objects and advantages thereof, may best be understood by reference to the following description taken in conjunction with the accompanying drawings, in which:

DETAILED DESCRIPTION OF THE PREFERRED EMBODIMENTS

A primary feature of the invention resides in the use of wake-up interrupt service routines in which something less than full system operation is initiated. Preferably, a system microcontroller is used which has a plurality of separate wake-up interrupts for restarting an operating state from either a halt mode or an idle mode. In the halt mode of a typical microcontroller, all activities are stopped, including the execution of program instructions, input and output, and the running of the oscillator and clock. In the idle mode, the oscillator and clock continue to operate while other activities such as instruction execution are stopped. Throughout the halt mode and the idle mode, the contents of memory, registers, and other microcontroller states are maintained in their original condition. An example of a microcontroller having both a halt state and an idle state is the COP888CG microcontroller from National Semiconductor Corporation.

Figure 1:
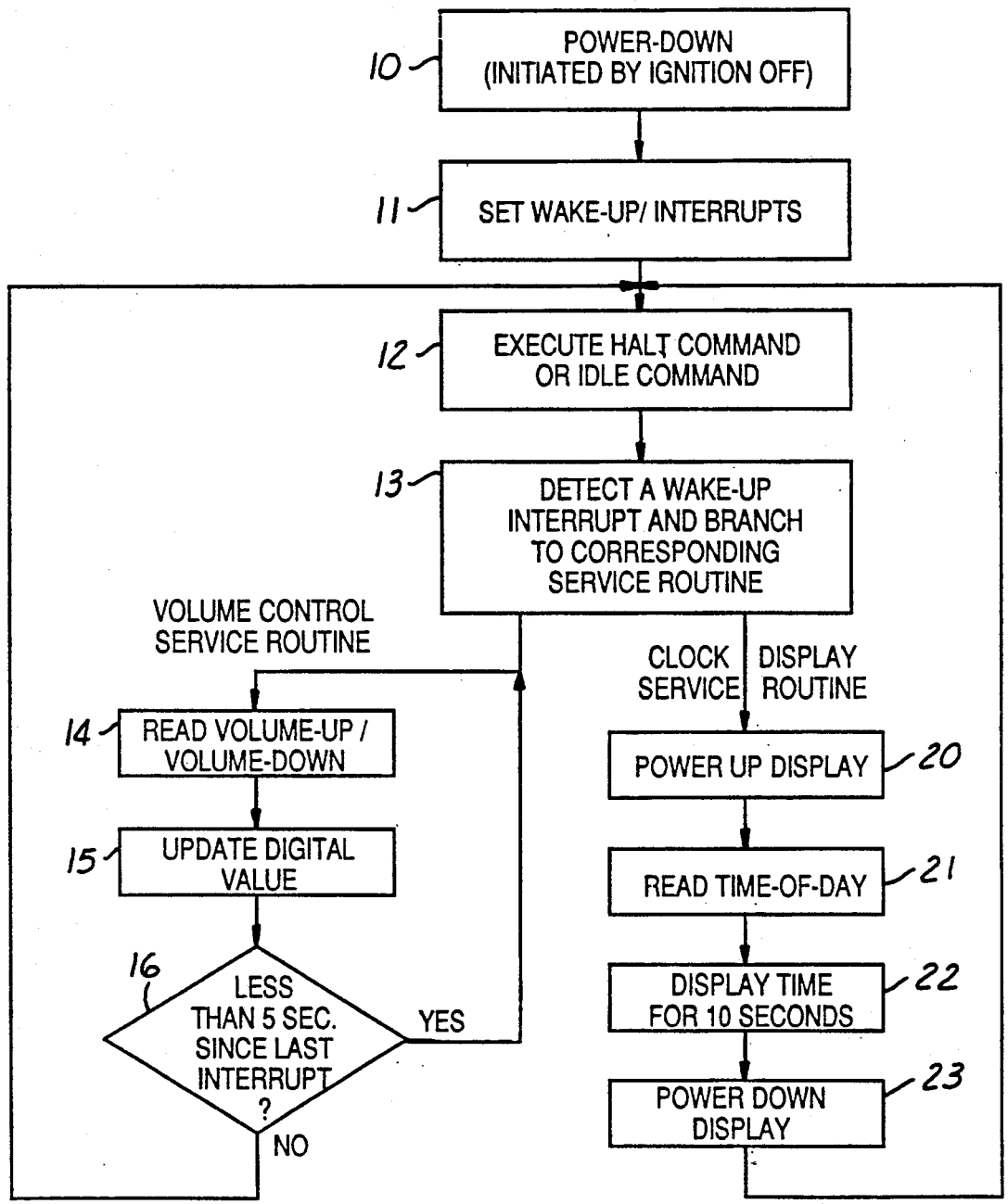
FIG. 1 is a flow chart according to a preferred embodiment of the invention.

Turning to FIG. 1, a preferred method according to the present invention begins at step 10 where a powered-down state of the microcontroller is initiated in response to the car ignition being turned off. As used herein, a powered-down state refers to either a halt state or an idle state, although a halt state is preferred since power consumption in an idle state is only reduced to about 30% of full power consumption.

Prior to actual power-down of the microcontroller, it must be prepared for waking up to specified signals. In the preferred embodiment of the invention, using a COP888CG microcontroller or equivalent, a multi-input wake-up/interrupt port is provided whereby one of a plurality of preset signals may initiate the waking up of the microcontroller. Other microcontrollers or microprocessors can be used as long as the source of the wake-up/interrupt is distinguishable from a power-on reset (e.g., from the ignition switch) which brings the system up to full operation.

In step 11, the wake-up/interrupts are set such that the microcontroller can be placed into a temporary operating state in response to interrupts on predetermined inputs of the microcontroller. Once the wake-up/interrupts are set, the halt or idle command is executed in step 12.

Following the powering down of the microcontroller, further operation of the microcontroller is stopped until a wake-up/interrupt is received. In step 13, such a wake-up/interrupt is detected and the microcontroller reenters its operating state with the oscillator being reactivated and program instruction being resumed. The microcontroller first determines the source of the interrupt on the multi-input wake-up port. If the interrupt was caused by the ignition sense line being turned ON, then full microcontroller operation is initiated until the ignition sense line is turned OFF. If the interrupt was caused by activity on a system control input, a temporary operating state is entered and the microcontroller branches to an appropriate service routine for performing an action corresponding to the source of the interrupt. For example, to adjust volume of the audio system without restoring full audio operation (i.e., speaker output of an audio program), a volume control button can be pushed which results in a particular interrupt signal on the multi-input wake-up port of the microcontroller. In response to the volume control activity, the microcontroller branches to a volume control service routine beginning at step 14 where the volume control button on the keypad matrix can be read by the microcontroller for volume up or volume down commands. In step 15, the digital value corresponding to system volume is updated. It is preferable to allow only down adjustments to the digital value such that system volume can only be decreased prior to powering-on the full audio system. The audio system display may include a section, such as a histogram comprising a plurality of segments, which presents a display corresponding to the current volume setting. In that event, it may be desirable to additionally power up the display during the volume setting in step 14 to provide user feedback.

In step 16, the microcontroller determines whether there has been any volume control activity in the last five seconds, or other predetermined time period. In the event that there has been control activity, the method returns to step 14 for further reading of the volume control. If there has been no activity on the volume control for the predetermined time, a return is made to step 12 wherein a halt or idle command is executed in order to enter the powered-down state of the microcontroller. If the display was powered up, it would be powered down prior to executing the halt or idle command.

In another embodiment of the method of the present invention, one can display a time-of-day according to a separate wake-up/interrupt while the car ignition is off. In response to the depression of a clock button on a keypad matrix, for example, an interrupt signal is generated and the microcontroller branches to a clock display service routine beginning at step 20 with a powering-up of the audio system display panel. In step 21, the time of day is read from either a separate time-of-day chip within the audio system or from a memory location within the microcontroller itself for keeping track of time-of-day. In step 22, the time of day is displayed for a predetermined period of time, such as about 10 seconds. The display is powered-down in step 23 and a return is made to step 12 for reentering the powered-down state.

In addition to providing a means of displaying the time-of-day, the invention can be extended to provide for the setting of the time-of-day while the automobile ignition is off. The controls corresponding to the setting of hours and minutes would be monitored during the temporary operating state and the memory values would be updated accordingly.

Main power-up from the ignition sense line can be instituted by a wake-up/interrupt from step 13, or can be initiated by a separate reset circuit as in the prior art.

Figure 2:
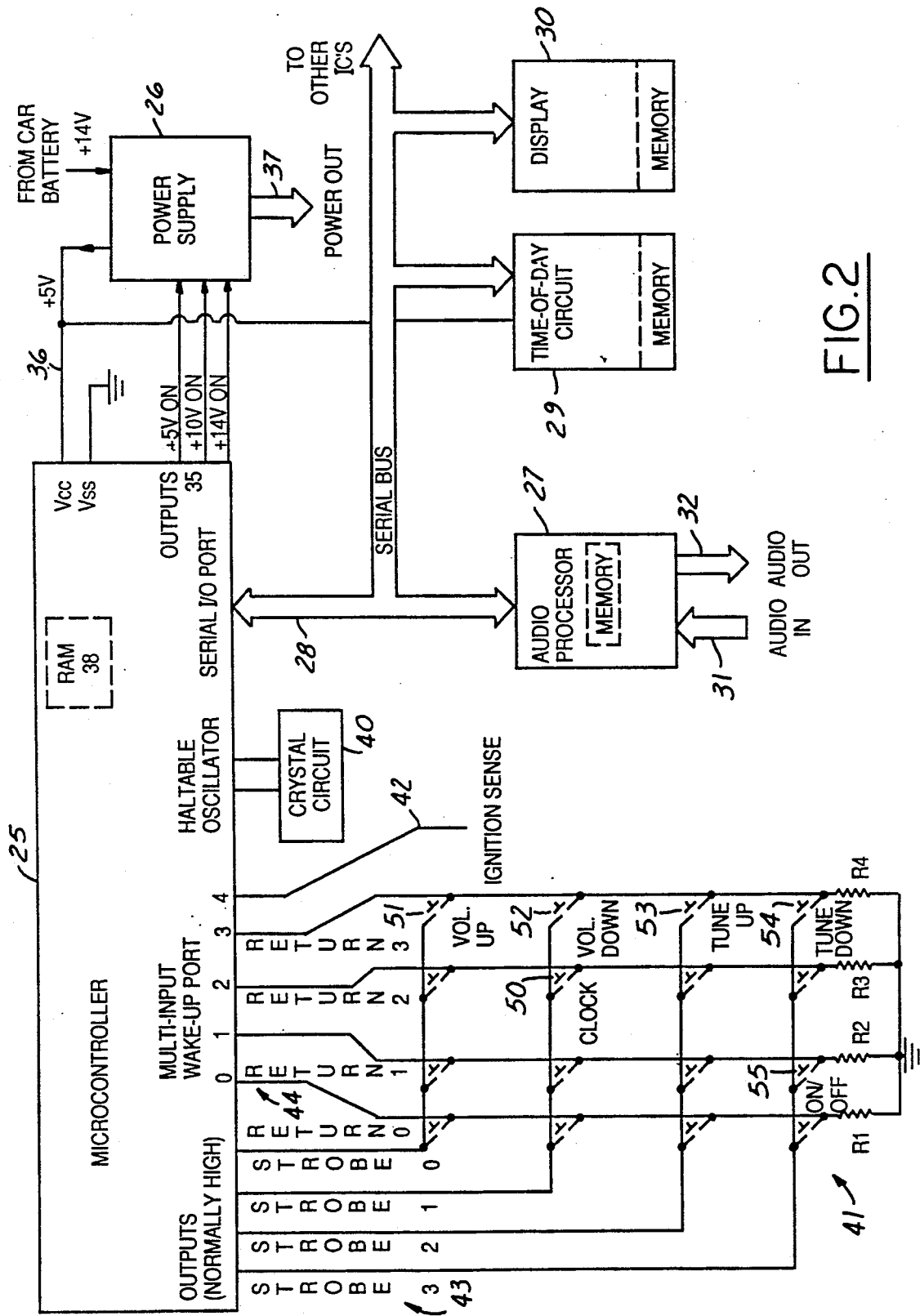
FIG. 2 is a schematic block diagram of a preferred apparatus according to the present invention.

Turning now to FIG. 2, a preferred apparatus includes a microcontroller 25 connected to a power supply 26. Microcontroller 25 is a master controller over an audio processor 27, a time-of-day circuit 29, and a display 30. Microcontroller 25 communicates data and commands and receives data over a serial bus 28.

Microcontroller 25 controls power supply 26 by means of outputs 35 on which a signal indicates whether power supply 26 should provide specific output voltages over its output 37. Thus, microcontroller 25 determines the amount of power available to the remainder of the audio system. Preferably, +5 volt memory line 36 is continuously powered in order to retain a keep-alive memory in RAM area 38 of microcontroller 25 and to continuously power time-of-day circuit 29. Power output lines 37 provide DC power to remaining system elements such as audio processor 27, display 30, and an AM/FM tuner (not shown).

Also connected to microcontroller 25 are a crystal circuit 40, a keypad matrix 41, and an ignition sense line 42. Crystal circuit 40 is coupled to a haltable oscillator in microcontroller 25 and provides timing for generation of clock signals on which microcontroller operation is based. Keypad matrix 41 is connected to a plurality of strobe lines 43 and a plurality of wake-up/interrupt lines 44 which are connected to the multi-input wake-up port of microcontroller 25. Ignition sense line 42 is also connected to the multi-input wake-up port of microcontroller 25.

During a normal operating state of microcontroller 25, the system elements are controlled over serial bus 28. For example, microcontroller 25 commands a volume level of an audio output by providing a digital value to audio processor 27. The digital value is likewise stored in RAM area 38. Audio signals provided at an input 31 to audio processor 27 are processed according to commanded parameters from microcontroller 25 such that audio signals at an output 32 correspond to a commanded volume level. Similarly, microcontroller 25 commands audio processor parameters such as bass, treble, balance, and fade.

Time-of-day circuit 29 operates off a five volt power level provided on line 36. The current time of day is maintained by circuit 29 but may be altered by adjustment commands over serial bus 28 from microcontroller 25. Furthermore, the current time-of-day maintained in a memory within circuit 29 is accessible to microcontroller 25 for display to the user via display 30. Microcontroller 25 commands the presentation of system parameters and time-of-day by display 30 using serial bus 28. Furthermore, volume level can be shown on display 30 in a histogram format, for example.

The multi-input wake-up port of microcontroller 25 functions as a set of ordinary interrupts when microcontroller 25 is in its normal operating state and is used herein to control system parameters such as volume level, time setting, etc. Strobe lines 43 are normally held at a high level such that depression of a key in keypad matrix 41 brings a return line high, causing an interrupt indicating a key depression. The return line on which the interrupt occurs designates the column of the keypad matrix which includes the depressed key. Microcontroller 25 then drops the output levels sequentially on strobe lines 43 until the interrupt return line corresponding to the depressed key also goes low, thereby indicating the row of the depressed key. Thus, an interrupt on return line #3, which transitions to a low level concurrent with the lowering of the level of strobe line zero, indicates a volume-up key depression. In response, microcontroller 25 modifies the volume digital value by a predetermined step size, stores the new value in RAM 38, and transmits a new volume level command to audio processor 27.

When the audio system of FIG. 2 is turned off, power on the +5 volt memory line 36 must be maintained in order to retain the contents of RAM 38 such as volume level, station frequency setting, bass level, etc. At the same time, it is desirable to reduce power drain from the battery by eliminating power to some circuit elements, e.g., display 30, and to reduce power consumption by microcontroller 25. Therefore, a powered-down state, preferably a halt state, is entered when ignition sense line 42 indicates that the ignition switch of the car has been turned off.

On initiating a powered-down state, microcontroller 25 enables wake-up/interrupt lines 44 according to desired control activities which will initiate a temporary operating state. For example, return lines 2 and 3 would be enabled in order to allow the waking up of microcontroller 25 in response to a depression of a clock button 50 or a volume-down button 52. However, return line zero would not be enabled if there were no functions in the first column of the keypad matrix which would trigger a temporary operating state of microcontroller 25.

Once selected interrupts have been enabled for waking up microcontroller 25, a halt instruction is executed which terminates operation of the haltable oscillator so that the execution of program instructions halts and power consumption is greatly reduced.

Upon the depression of a key which results in an interrupt, microcontroller 25 again begins operation of the haltable oscillator such that program instruction execution resumes after the oscillator has stabilized. Upon waking up of microcontroller 25, the source of the interrupt is determined by examining return lines 44 and removing the high outputs sequentially on strobe lines 43 as described above. After identification of the source of the interrupt, an appropriate service routine is executed according to the functions invoked. Thus, if volume-up button 51 or volume-down button 52 have been depressed, the volume level digital value stored in RAM 38 is adjusted by a predetermined step size. Operation of microcontroller 25 continues to allow further depressions of volume-up button 51 or volume-down button 52 to allow a full range of volume adjustment. If display 30 includes segments for indicating the volume setting, microcontroller 25 causes display 30 to be energized with the appropriate indication of volume during the adjustment. Once volume control activity ceases for a predetermined time, such as five seconds, microcontroller 25 executes another halt command after initializing the wake-up/interrupts.

When a temporary operating state is initiated by depression of clock key 50 causing an interrupt on return line 2, microcontroller 25 commands power supply 26 to provide power to display 30. Microcontroller 25 obtains the current time of day from a memory in time-of-day circuit 29 over serial bus 28. The time-of-day value is then communicated to display 30 from microcontroller 25 over the same serial bus 28. Display 30 is instructed to present the time-of-day information, and after a predetermined time, microcontroller 25 removes power from display 30 and reenters its halt state as described earlier. Although a separate time-of-day circuit 29 is shown in the present embodiment, the clock function can alteratively be implemented within microcontroller 25. In that case, rather than entering a halt state in which the oscillator is shut down, microcontroller 25 would enter an idle state as its power-down state. In the idle state, program instruction execution stops, but the oscillator continues to run such that microcontroller 25 is still able to keep track of elapsed time. After counting out a certain number of pulses from the oscillator, an internal interrupt would be generated such that program instruction would begin to update the time value and then return to the idle state.

Figure 3:
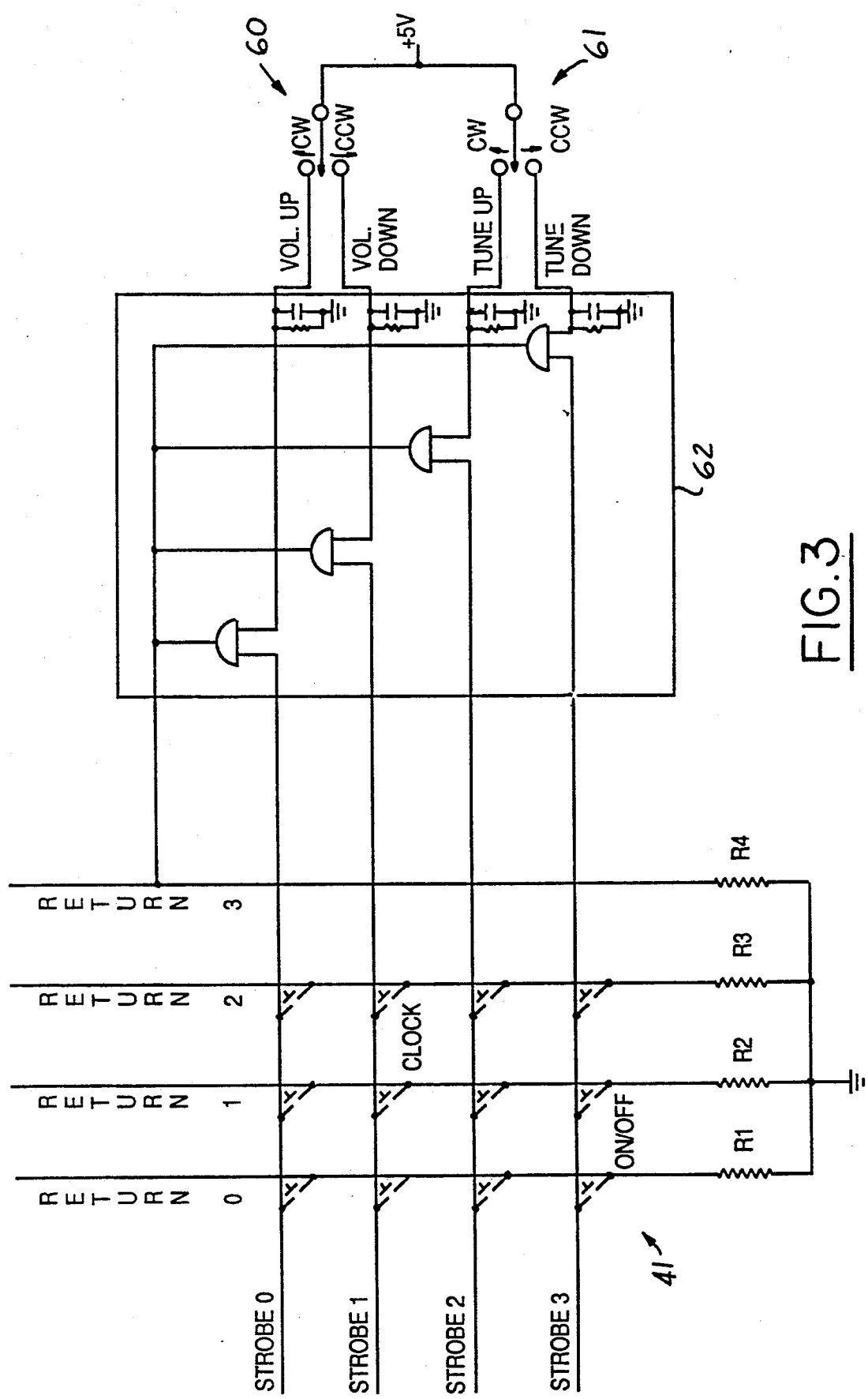
FIG. 3 is a schematic block diagram according to an alternative embodiment of the present invention.

Turning now to FIG. 3, an alternative embodiment of the input means of the present invention is shown. In addition to keypad matrix 41, continuous rotary controls 60 and 61, such as the K121FL rotary tuning switch manufactured by Alps, Inc., generate pulses to indicate clockwise or counterclockwise rotation of the control. These pulses are used to provide incremental changes to system parameters. Rotary control 60 provides volume-up and volume-down pulses by clockwise or counterclockwise rotations of a knob (not shown) such that pulses are provided to a debounce and logic circuit 62. Likewise, rotary control 61 provides up or down pulses for tuning of a radio receiver frequency. Debounce circuit 62 receives the pulses from controls 60 and 61 and provides output pulses having improved leading and trailing edges to ensure proper reading by microcontroller 25. A plurality of RC circuits in debounce circuit 62 provide this signal conditioning function by virtue of their RC time constant. Debounce circuit 62 also includes logic circuitry such as a series of AND gates which are responsive to strobe lines 43 such that output pulses are enabled by a high level on a respective strobe line. This effectively isolates the debounce capacitors from the return line when the input scan routine sequentially sets the strobe lines low while searching for a closed contact.

By way of further example, other audio system functions could additionally be implemented with the car ignition off in response to corresponding wake-up interrupts if associated service routines are provided. For instance, a tape or CD could be removed from the system by providing for a temporary operating state having a tape or CD ejection service routine. It is even possible to allow sound output of the system without requiring that the car ignition be turned on.

The foregoing has described an audio system having a microcontroller external interrupt/wake-up feature which provides live digital controls even when the audio system and the automobile are off. Thus, the system more closely emulates the behavior of traditional radios having analog volume control potentiometers, mechanical tuning, and analog clocks. Although a single microcontroller has been shown and described, the invention is applicable to a multi-microcontroller architecture as is described in copending U.S. application Ser. No. 07/288,606.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for initiating a system activity in a temporarily powered-down microprocessor-controlled audio system, said method comprising the steps of:
    instituting an interruptible reduced-power state of said microprocessor with system parameters stored in a keep-alive memory;
    generating an interrupt signal in response to a non-main power-up control activity on at least one input device of said audio system while said microprocessor is in said reduced-power state and providing said interrupt signal to said microprocessor;
    resuming program execution in said microprocessor upon receipt of said interrupt signal without restoring full audio operation of said audio system;
    determining the source of said interrupt signal; and
    executing a service routing corresponding to said source of said interrupt signal.

2. The method of claim 1 further comprising the step of:
    returning said microprocessor to said reduced-power state after a predetermined period of time.

3. The method of claim 2 wherein a stored system parameter is modified and wherein said service routine comprises the steps of:
    determining a new parameter value based on said control activity; and
    storing said new parameter value as a replacement of said stored parameter in said keep-alive memory.

4. The method of claim 3 wherein said stored parameter is an audio output volume of said audio system.

5. The method of claim 4 wherein said new parameter value is limited to being less than said stored parameter value.

6. The method of claim 1 wherein a stored system parameter is displayed and wherein said service routine comprises the steps of:
    powering on a display device of said audio system;
    transmitting said stored parameter from said keep-alive memory to said display device; and
    displaying said transmitted parameter.

7. The method of claim 6 wherein said stored parameter is the time of day.

8. The method of claim 6 wherein said stored parameter is an audio output volume level.

9. A method for operating a microprocessor-controlled audio system comprising the steps of:
    instituting an interruptible reduced-power state of said microprocessor with system parameters stored in a keep-alive memory in response to a main power off condition;
    generating an interrupt signal in response to a non-main power-up control activity on an input device of said audio system while said microprocessor is in said reduced-power state and providing said interrupt signal to said microprocessor;
    restarting program execution in said microprocessor upon receipt of said interrupt signal without restoring full audio operation of said audio system;
    determining a new parameter value based on said control activity;
    storing said new parameter value as a replacement of said stored parameter in said keep-alive memory;
    returning said microprocessor to said reduced-power state when said control activity ceases for a predetermined period of time;
    restarting program execution in said microprocessor in response to a main power on condition; and initializing an operating parameter of said audio system according to the latest value of said stored parameter.

10. The method of claim 9 wherein said stored parameter is an audio output volume of said audio system.

11. The method of claim 10 wherein said new parameter value is limited to being less than said stored parameter value.

12. An automotive audio system comprising:
an audio processing circuit;
a display;
microprocessor means coupled to said audio processing circuit and to said display for controlling said audio system while in an operating state, said microprocessor means having a powered-down state for reducing power consumption initiated by a power-down command, said operating state being reactivated from said powered-down state by a wake-up signal, said microprocessor means storing at least one parameter of said audio system in accordance with a digital value, said microprocessor means including a random access memory having a memory location storing said digital value such that said digital value is retained in said memory during said powered-down state;
ignition sense means coupled to said microprocessor means having an off state for generating a power-down command and having an on state for generating a first wake-up signal;
input means coupled to said microprocessor means for generating a second wake-up signal when actuated while said microprocessor means is in said powered-down state and for initiating a temporary operating state of said microprocessor means for executing a service routine corresponding to said second wake-up signal;
clock means coupled to said microprocessor means for maintaining a time-of-day value; and
a time selector included in said input means for generating said second wake-up signal and thereby initiating a service routine for temporarily displaying said time-of-day value.

13. The system of claim 12 further comprising:
clock setting means included in said input means for setting hours and minutes of said clock during said temporary operating state.

14. An audio system comprising:
an audio processing circuit;
microprocessor means for controlling said audio system while in an operating state, said microprocessor means having a halt state for reducing power consumption initiated by a halt command, said operating state being reactivated from said halt state by a wake-up signal, said microprocessor means controlling audio output volume of said audio system in accordance with a digital value provided by said microprocessor means to said audio processing circuit, said microprocessor means including a static random access memory having a memory location storing said digital value;
ignition sense means coupled to said microprocessor means having an off state for generating a halt command and having an on state for generating a first wake-up signal;
volume means coupled to said microprocessor means for generating a second wake-up signal when actuated while said microprocessor means is in said halt state and for generating up or down volume control signals for changing said digital value when actuated while said microprocessor means is in said operating state.

15. The system of claim 14 wherein said microprocessor means further comprises timing means coupled to said volume means for producing a halt command after said microprocessor means has been awakened by said volume means and after said volume means has not been actuated for a predetermined time period.

16. The system of claim 14 wherein said microprocessor means includes a haltable oscillator.

* * * * *